(12) United States Patent
Patel et al.

(10) Patent No.: US 9,424,482 B2
(45) Date of Patent: Aug. 23, 2016

(54) METHOD AND APPARATUS FOR IMAGE PROCESSING TO AVOID COUNTING SHELF EDGE PROMOTIONAL LABELS WHEN COUNTING PRODUCT LABELS

(71) Applicant: SYMBOL TECHNOLOGIES, LLC, Lincolnshire, IL (US)

(72) Inventors: Ankur R. Patel, Palatine, IL (US); Boaz J. Super, Oak Park, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 278 days.

(21) Appl. No.: 14/068,495

(22) Filed: Oct. 31, 2013

(65) Prior Publication Data

US 2015/0117788 A1  Apr. 30, 2015

(51) Int. Cl.
| | |
|---|---|
| G06K 9/48 | (2006.01) |
| G06K 9/46 | (2006.01) |
| G06F 17/30 | (2006.01) |
| G06K 9/32 | (2006.01) |
| G06K 9/62 | (2006.01) |
| G06K 9/00 | (2006.01) |

(52) U.S. Cl.
CPC ........ *G06K 9/4604* (2013.01); *G06F 17/30247* (2013.01); *G06F 17/30256* (2013.01); *G06K 9/00771* (2013.01); *G06K 9/3241* (2013.01); *G06K 9/4671* (2013.01); *G06K 9/6202* (2013.01); *G06K 9/6218* (2013.01); *G06K 9/6222* (2013.01); *G06K 9/6226* (2013.01)

(58) Field of Classification Search
CPC .. G06K 9/4604; G06K 9/6202; G06K 9/6218
See application file for complete search history.

(56) References Cited

U.S. PATENT DOCUMENTS

| | | | |
|---|---|---|---|
| 6,836,567 B1 | 12/2004 | Silver et al. | |
| 7,693,757 B2 | 4/2010 | Zimmerman | |
| 8,091,782 B2 | 1/2012 | Cato et al. | |
| 8,189,855 B2 | 5/2012 | Opalach et al. | |
| 8,939,369 B2 * | 1/2015 | Olmstead | G06K 7/10722 235/438 |
| 2003/0174891 A1 | 9/2003 | Wenzel et al. | |
| 2006/0032915 A1 * | 2/2006 | Schwartz | G06Q 20/208 235/383 |
| 2012/0201466 A1 | 8/2012 | Funayama et al. | |

(Continued)

FOREIGN PATENT DOCUMENTS

| | | |
|---|---|---|
| EP | 2472475 A1 | 7/2012 |
| WO | 2014181323 A1 | 11/2014 |

OTHER PUBLICATIONS

N.Senthilkumaran, et al., "Edge Detection Techniques for Image Segmentation—A Survey of Soft Computing Approaches", International Journal of Recent Trends in Engineering, vol. 1, No. 2, May 2009.

(Continued)

*Primary Examiner* — Gregory M Desire

(57) ABSTRACT

A method and apparatus for image processing to avoid counting shelf edge promotional labels when counting product labels. Shelf edges are identified by detecting shelf edge content in a captured image by comparing the image to reference images of shelf edge content. Detected occurrences of shelf edge content are demarcated using a geometric pattern having corners at coordinates corresponding to positions around the identified shelf edge content. Corresponding corners are grouped into clusters, and the clusters are analyzed to define the upper and lower bounds of a shelf region in the image.

13 Claims, 6 Drawing Sheets

(56) References Cited

U.S. PATENT DOCUMENTS

| | | | |
|---|---|---|---|
| 2012/0323620 A1 | 12/2012 | Hofman et al. | |
| 2013/0134178 A1 | 5/2013 | Lu | |
| 2014/0003655 A1 | 1/2014 | Gopalakrishnan et al. | |
| 2014/0003727 A1* | 1/2014 | Lortz | G06Q 10/087 382/218 |
| 2015/0117788 A1* | 4/2015 | Patel | G06F 17/30247 382/199 |

OTHER PUBLICATIONS

Richard O. Duda, et al., "Use of the Hough Transformation to Detect Lines and Curves in Pictures", Stanford Research Institute, Menlo Park, California, Graphics and Image Processing. Communications of the ACM, Jan. 1972, vol. 15, No. 1.

Combined Search and Examination Report dated Mar. 11, 2015 in counterpart UK patent application GB1417218.3.

United Kingdom Intellectual Property Office, "Combined Search and Examination Report," mailed on Jan. 22, 2016 in connection with GB Patent Application No. 1521272.3 (6 pages).

United Kingdom Intellectual Property Office, "Examination Report," mailed on Jan. 22, 2016 in connection with GB Patent Application No. 1417218.3 (2 pages).

* cited by examiner

METHOD AND APPARATUS FOR IMAGE PROCESSING TO AVOID COUNTING SHELF EDGE PROMOTIONAL LABELS WHEN COUNTING PRODUCT LABELS

CROSS-REFERENCE TO RELATED APPLICATIONS

The present application is related to the following U.S. application commonly owned with this application by Motorola Solutions, Inc.: Ser. No. 13/916,326, filed Jun. 12, 2013, titled "Method for Detecting a Plurality of Instances of an Object", the entire contents of which being incorporated herein by reference.

FIELD OF THE DISCLOSURE

The present disclosure relates generally to retail shelf intelligence systems using photographic means for identifying on-shelf products, and more particularly to photographic product counting systems that identify and count product labels on shelved product items where the shelves have promotional or other graphical media that resembles product labels on shelf edges.

BACKGROUND

Retail businesses have had an increasing desire to monitor the state of store shelves to ensure merchandise is available and in the correct place. When merchandise is not available on store shelves, the business could be losing sales opportunities. In some cases the stores themselves do not stock the shelves and rely on product distributors to keep shelves stocked. Retailers, and their manufacturer/distributor partners with whom they share information, can get sales information from point of sale data to determine rate of sales and to manage inventory. Likewise, there have been systems developed to track products while in transport, and store inventory. However, shelf information is not yet as developed as point of sale data.

For higher priced items, radio frequency identification (RFID) tags can be affixed to individual items, and an in-store transponder can periodically check for the presence of items. But for low cost, high volume items RFID is not a practical means of tracking real time on-shelf product or merchandise information. Some retailers have begun using cameras to monitor shelves, coupled with image processing technology to recognize and count product items on shelves. However, these systems can confuse promotional material that shows graphical content similar or identical to product labels with products themselves, and miscount the number of items on product shelves.

Accordingly, there is a need for an improved method and apparatus that solves the problems associated with the prior art distinguishing between product labels and shelf edge promotional content so that shelf edge content is not counted falsely as product labels.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
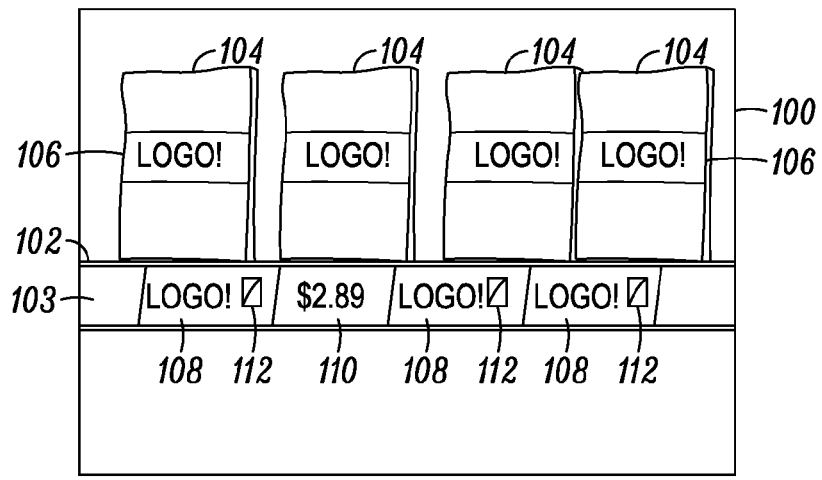
FIG. 1 is a line drawing of a captured image of a retail store shelf in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments include a method for processing retail store shelf images. The method can include receiving an image containing shelf edge content displayed on a shelf edge. The method can further include determining a location of the shelf edge content. The method can further include determining an apparent orientation of the shelf edge content. Based on the location and apparent orientation of the shelf edge content, the method determines a region in the image corresponding to the shelf edge. The method further also provides an output based on the image that identifies the region in the image corresponding to the shelf edge. The output can then be used by a product counting image processor to count product items in the image without falsely counting shelf edge labels FIG. 1 is a line drawing of a captured image 100 of a retail store shelf in accordance with some embodiments. The image 100 is meant to depict a photograph, and is illustrated here as a line drawing for clarity. Hence, image 100 will be referred to as though it is a photographic image. In particular, the image 100 represents a digital image that can be produced, for example, by a digital camera aimed at a retail store shelf 102.

On the shelf 102 are several product items 104 which have product labels 106. The image 100 can be processed by an image recognition system to identify and count product labels such as that disclosed in commonly assigned U.S. patent application Ser. No. 13/916,326, filed Jun. 12, 2013. However, the shelf 102 has a shelf edge 103, on which are one or more shelf edge labels 108 which are pictographic media that include media that resembles, if not identical to, the product labels 106. The shelf edge 103 is generally a surface facing into an aisle or otherwise oriented so that labels 108 and price tags 110 retained on the shelf edge 103 can be seen by people positioned in front of, or proximate to the shelf 102. The shelf edge labels 108 are shelf edge content and can include promotional content such as product logos or other content associated with the manufacturer of the product items 104. The shelf edge labels will typically contain a difference 112 from an actual product label 106. The difference 112 can be a smaller logo or graphic, or the label 108 can contain no content that is similar to the product labels 106. The difference 112 is graphical content that is present in shelf edge labels 108 but that is not present on the product labels 106. More subtle differences can be present between the shelf edge labels 108 and the product labels 106. Because of similarities that exist between the shelf edge labels 108 and product labels, an image-based product item counting system can mistakenly count shelf edge labels 108 as product items, leading to inaccuracies in the system's output.

Figure 2:
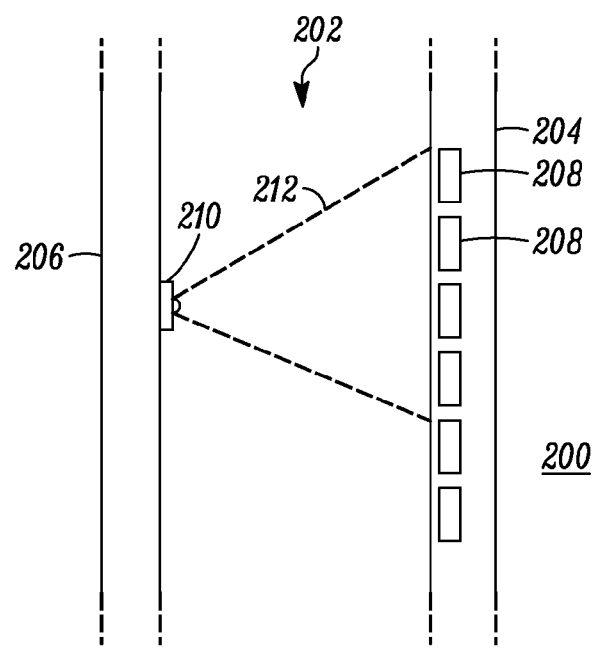
FIG. 2 is a top plan view of a retail store aisle in accordance with some embodiments.

The image 100 of FIG. 1 can be produced using a capture system such as that shown, for example, in FIG. 2, which is a top plan view 200 of a retail store aisle 202 in accordance with some embodiments. Typically, an aisle 202 is a walkway space between opposing shelves 204, 206, or in front of a shelf unit. As used here the term "shelf unit" refers to one or more surfaces that are above floor level, and on which product items can be placed or hung for customers to take for purchase at a point of sale. Examples of shelf units may include, but are not limited to, a single shelf, a gondola shelf module, a refrigerated product display unit, a freezer case, a vending machine, a free-standing floor display, and a wire rack. A product item is any unit of merchandise that is placed or hung for sale. Product items 208 can be placed and displayed on shelf 204. Across the aisle, so as to have a view of the shelf 204, is a camera 210 having a field of view 212 that will include a portion of the shelf 204 and product items 208. In some embodiments, the camera 210 can be mounted on the opposing shelf 206 across the aisle 202 from shelf 204. In some embodiments the camera 210 can be mounted in other locations, such as on the ceiling above the shelves 204, 206 as long as it has a field of view 212 that can "see" the product items 208 sufficiently to produce an image with sufficient clarity to identify product labels (e.g. 106). In some embodiments the camera 210 can be mounted on a moveable apparatus that is moved along aisle 202 to capture shelf level images. In some embodiments, the camera may be held by a person, operated by a person, or both. In some embodiments, the camera may be integrated with other sensing devices.

Figure 3:
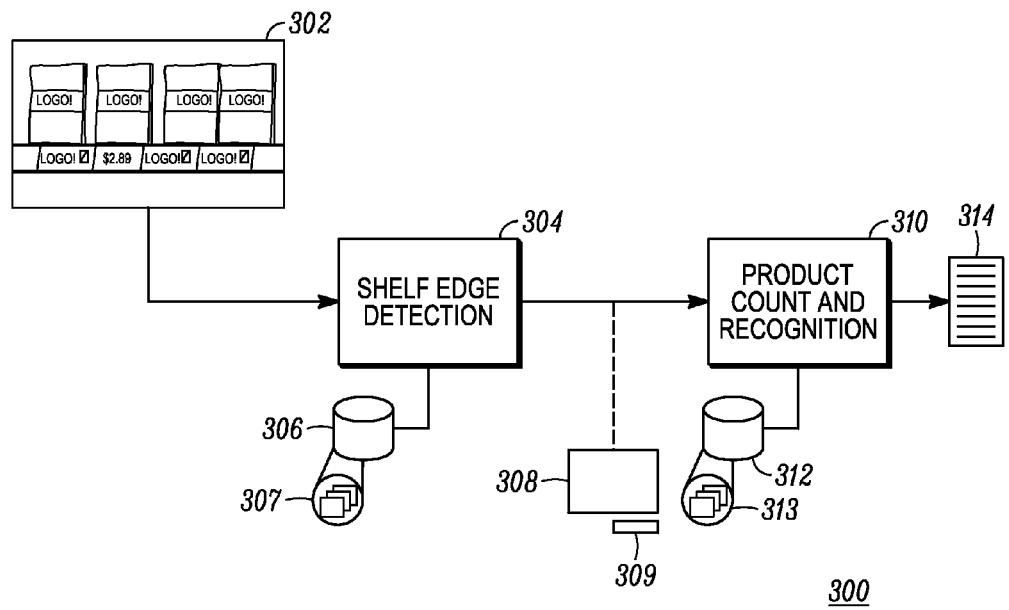
FIG. 3 is a process diagram for identifying shelf edge content in an image of a retail store shelf in accordance with some embodiments.

FIG. 3 is a process diagram of a system 300 for identifying shelf edge content in an image 302 of a retail store shelf in accordance with some embodiments. The image 302 can be substantially similar to that shown FIG. 1. The image 302 can be captured by, for example, an in-store camera, and can be received by a shelf edge detection component 304 of the system 300. The shelf edge detection component 304 includes a hardware system having one or more processors that execute instruction code designed in accordance with the teachings herein to carry out the described functionality. Generally, the shelf edge detection component 304 identifies shelf edges in the image 302 by comparing the image with one or more reference images 307 that can be stored in a database 306 that is accessible by the shelf edge detection component 304. The reference images 307 need not be photographic images, but can be data that is representative of a shelf edge item. More particularly, the shelf edge detection component 304 can determine the location and apparent orientation of shelf edge content displayed on shelf edges. The reference images 307 are images or data representative of shelf edge labels or other shelf edge promotional content. To identify shelf edges in the image 302 in some embodiments, the shelf edge detection component 304 compares reference images 307 to the image 302, and in particular to various regions of the image 302 to find regions of the image that correspond to a reference image. The reference images can be decomposed into a statistical model that can then be used to compare against similar statistical models of the image 302 or sections of the image 302 to determine matches between the reference image or images 307 and sections of the image 302. In particular, the differences between the shelf edge labels and product labels are searched for in image 302 to detect shelf edge labels.

Figure 4:
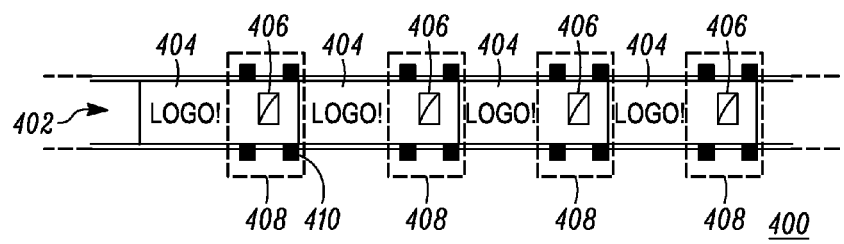
FIG. 4 is a line drawing of a shelf edge section of a captured image during processing in accordance with some embodiments.

For each detected occurrence or instance of a shelf edge label in image 302, the shelf edge detection component can demarcate the detected shelf edge label content in memory by determining the two dimensional coordinates that correspond to the position of a geometric pattern around the detected shelf edge content. In an embodiment, the geometric pattern is represented by the two dimensional coordinates and is not necessarily visibly marked in the image. Referring briefly to FIG. 4, which shows a line drawing of a shelf edge section 400 of a captured image in accordance with some embodiments, a shelf edge 402 is shown with several shelf edge labels 404. Shown as an overlay in FIG. 4 for illustrative purposes, there are geometric patterns 408 having corners 410 located at coordinates around a position of each label 404. Each label 404 includes pictographic content (including graphical and textual content) that is similar to a product label and pictographic content that is different from product labels. The differences 406 of each shelf edge label 404 are identified by the shelf edge detection component 304. The differences can be detected by determining interest point matches between the image and the reference image data that identifies the shelf edge labels or portions of the shelf edge labels that correspond with a reference image. The differences 406 are demarcated by determining the coordinates, relative to the image 400, of commonly oriented geometric patterns 408 having multiple (at least three) vertices or corners 410 that are shown here as an overlay to represent the coordinates relative to the image 400. The geometric patterns 408 are not added to, or otherwise drawn in the image 400, rather, the system determines coordinates of image 400 that correspond to positions around the detected shelf edge labels, as shown in FIG. 4. The geometric patterns 408 can be determined, for example, by applying a geometric model fitting and verification algorithm to estimate a shape based on the detected interest point matches. As shown here, the dashed line sections referenced by 408 show the area in the image that is being demarcated by corners 410 of the geometric pattern.

Figure 5:
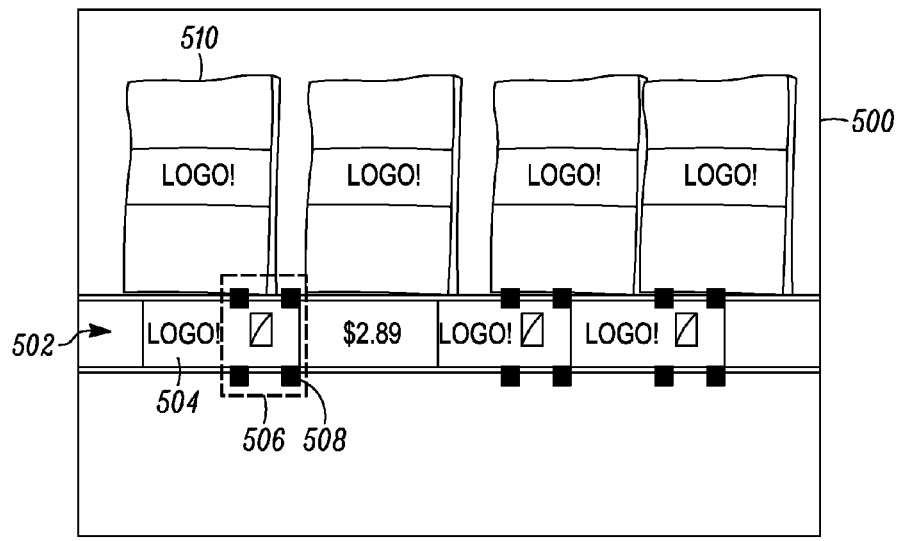
FIG. 5 is a line drawing of a captured image of a retail store shelf during processing in accordance with some embodiments.

FIG. 5 is a line drawing of a captured image 500 of a retail store shelf in accordance with some embodiments, as in FIG. 1, and further showing relative coordinate positions of corners 508 of geometric patterns. The image 500 includes the content of FIG. 1, and shows the demarcated shelf edge labels 504 as in FIG. 4. The shelf edge labels 504 are demarcated by detecting portions 506 of the shelf edge labels 504 (which can be the entire label 504) that matches reference image data 307. The portions 506 are demarcated in memory by corners 508 of a commonly oriented geometric pattern, such as a quadrilateral, at coordinates corresponding to the corners 508 as shown in FIG. 5. A small square element is used here at each corner 508 to show the coordinate position of the corners 508 relative to image 500. The coordinates of each corner 508 are maintained in memory, and can be ordered. Thus, as can be seen, each identified label portion 506 is identified and demarcated by the shelf edge detection component 304 using the same geometric pattern of corners 508 located at coordinates corresponding to positions around each identified portion 506.

In some embodiments, a recursively or iteratively applied robust fitting method can be used, such as, for example, random sample consensus (RANSAC), to determine the coordinates of the corners 508 of the geometric patterns. Other known fitting methods may alternatively be applied. RANSAC estimates the pose parameters of the geometric patterns. Four pose parameters of a 2D similarity transformation are estimated (2 translation, 1 rotation, and 1 scale). Those skilled in the art will recognize that alternative sets of pose parameters may be estimated instead, for example, six pose parameters corresponding to a 2D affine transformation may be estimated. The stopping criterion of the recursion or iteration will be reached when there are insufficient matching points remaining for the fitting method to estimate the pose parameters. In alternative embodiments, other stopping parameters may be used, for example, based on resources, time, or error. A verification test is applied to filter out false positives. In some embodiments, the test is an application of rotation and scale thresholds. Other thresholds or other tests may be applied.

Figure 6:
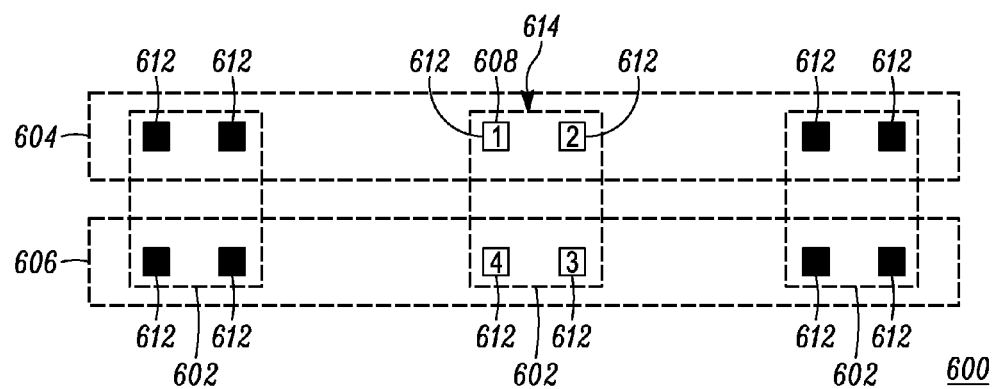
FIG. 6 is a line drawing of commonly oriented geometric patterns used to demarcate identified shelf edge promotional labels in accordance with some embodiments.
Figure 7:
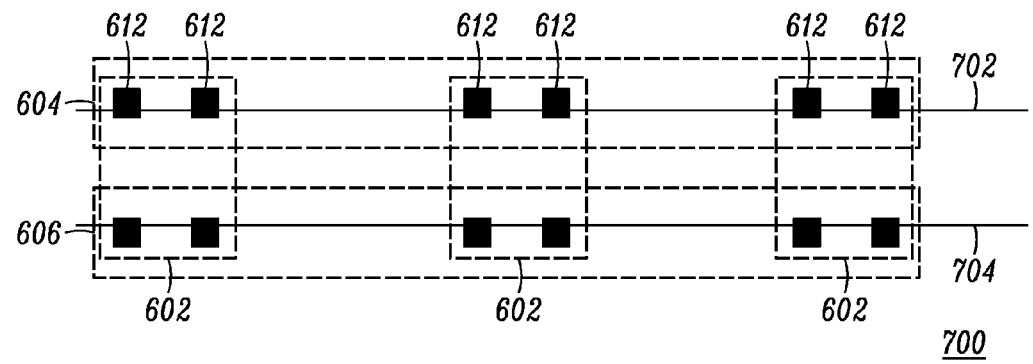
FIG. 7 is a line drawing of commonly oriented geometric patterns having vertices grouped to identify upper and lower bounds of a shelf edge in accordance with some embodiments.

FIG. 6 is a line drawing corresponding to a portion of an image 600 showing commonly oriented geometric patterns 602 used to demarcate identified shelf edge promotional labels in accordance with some embodiments. In the image portion 600, which can correspond to an image such as image 500, all but the elements 612 used to demarcate the geometric patterns 602 have been removed. Again, the elements 612 represent coordinate locations of an image being processed. The coordinate locations can be horizontal and vertical locations, pixel numbers, pixel locations, or other coordinates that map to the image being processed. The elements can be ordered, as shown in pattern 614, where they are numbered 1-4 in a clockwise order, starting at the upper left element. The ordering shown here is one example of how the ordering can be performed. In alternative embodiments, other orderings of the elements 612 can be used. The ordering of the elements 612 can be used to split them into groups or sets. The first and second elements 612 of each geometric pattern 602 belong to a first set 604 and the third and fourth elements 612 of each geometric pattern 602 belong to a second set 606. The elements belonging to the sets 604,606 are used to fit two lines, as indicated in FIG. 7 which shows a series of grouped elements 612 (grayed out) of commonly oriented geometric patterns 602 having elements 612 grouped to identify upper and lower bounds of a shelf edge in accordance with some embodiments. They are grouped in a first set 604 and a second set 606. A first line 702 can be fitted using the elements belonging to the first set 604 and a second line 704 can be fitted using the elements belonging to the second set 606. The first and second lines 702, 704 establish the upper and lower bounds of a shelf edge. The fitting of the lines is performed by the shelf edge detection component 304 of the system 300 in FIG. 3.

Figure 8:
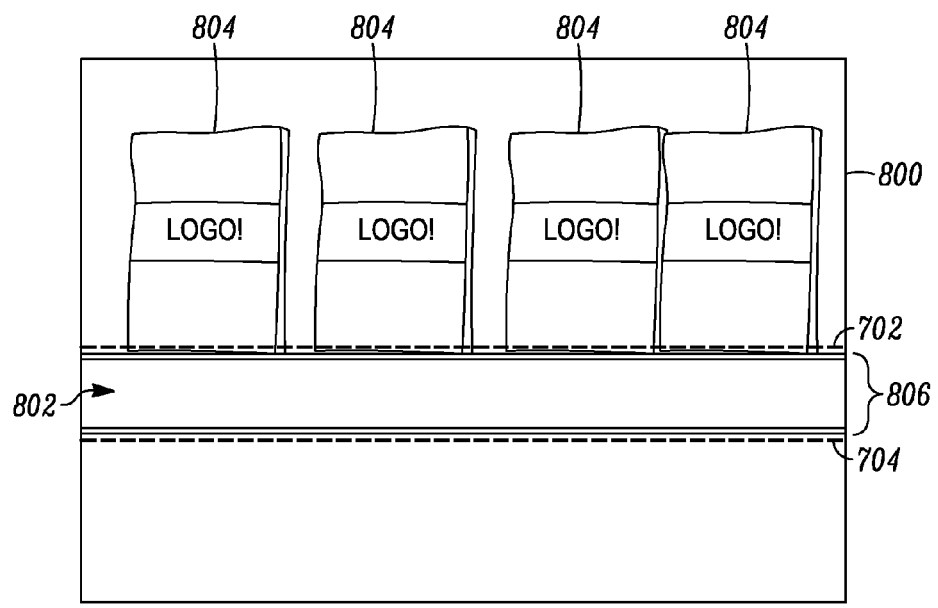
FIG. 8 is a line drawing of a processed image having shelf edge content obscured after processing in accordance with some embodiments.

Once the upper and lower bounds of a shelf edge are determined, the shelf edge detection component 304 can identify a shelf edge region between the upper and lower bounds 702, 704 which is to be ignored by a product recognition and counting component 310. As shown in FIG. 8, which is a line drawing of a processed image 800 having shelf edge content obscured after processing in accordance with some embodiments. A shelf edge 802 is bounded by upper bound 702 and a lower bound 704, and has product items 804 visible above the shelf edge 802 (on top of the shelf). The region 806 between the bounds 702, 704, which correspond to the shelf edge, has been modified so that the shelf edge labels previously visible there are no longer present, or are otherwise obscured. The image 800 is one example of an output of the shelf edge detection component 304. Referring again the FIG. 3, the shelf edge detection component 304 can provide various outputs for further processing by the product recognition and counting component 310 where the shelf edge region is identified, either by being obscured or by data identifying the location of the shelf edge region. For example, a processed image 308, such as that represented by FIG. 8, with the shelf edge region 806 obscured, can be produced by the shelf edge detection component 304. In some embodiments the shelf edge detection component 304 does not modify the image 302, but rather produces metadata 309 that identifies shelf edge regions in the image 302 that are to be avoided by the product recognition and counting component 310. The product recognition and counting component 310 can be a hardware system including one or more processors that execute instruction code designed in accordance with the teachings herein to carry out the described functionality of the product recognition and counting component 310. Generally, the product recognition and counting component 310 uses the output (e.g. 308 or 309) of the shelf edge detection component 304 and processes a store shelf image (e.g. 302 or 308) by comparing the image 302 or 308 to product reference images or image data 313 in a database 312 to identify and count instances or occurrences of product items in the image being processed. The database 312 can be the same as database 306. The product recognition and counting component 310 can use conventional image recognition methods to identify product items. The output of the product recognition and counting component 310 can be a report 314 indicating the number of items detected on store shelves. The report 314 can be in extended markup language (XML) for presentation by a suitable application.

Figure 9:
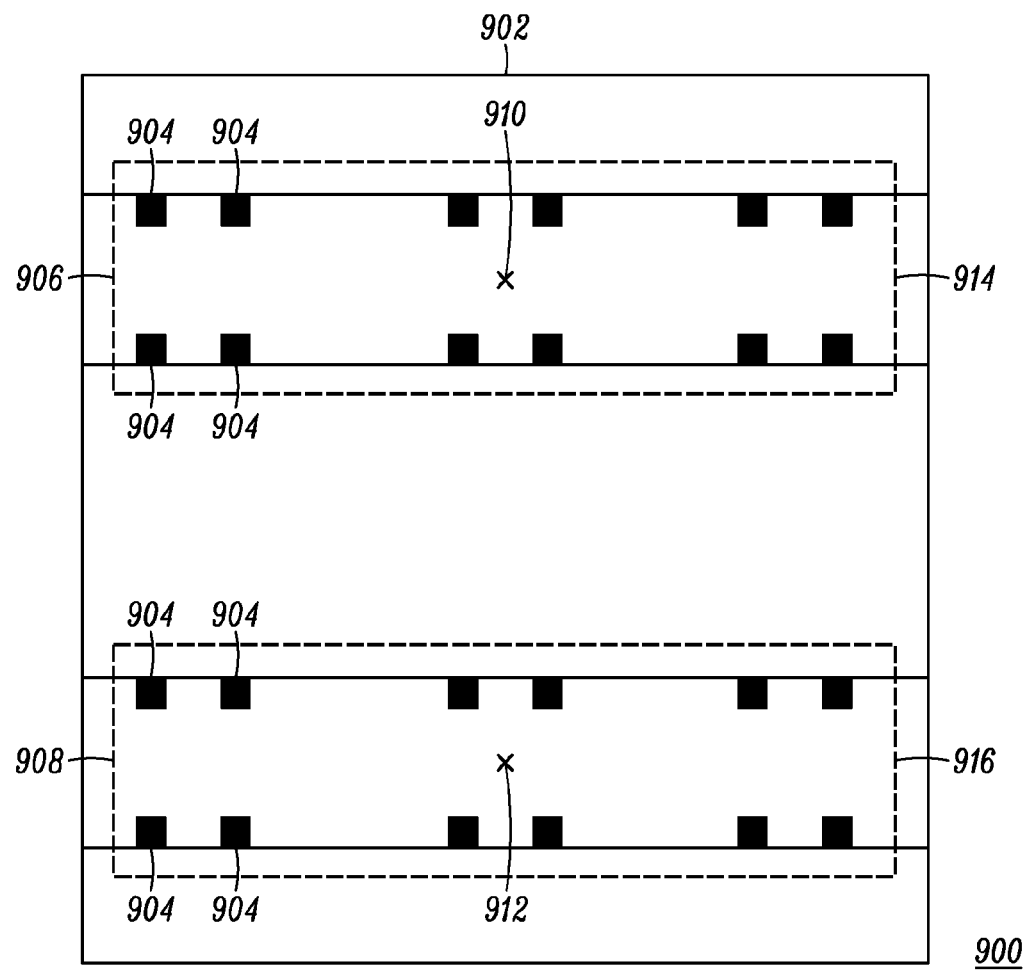
FIG. 9 shows a line drawing of an overlay of geometric patterns for multiple shelf edges, in accordance with some embodiments.

FIG. 9 shows a line drawing of an overlay 900 of geometric patterns for multiple shelf edges, in accordance with some embodiments. The overlay 900 includes an image field 902 representing a field of view of an image or image section of a shelving unit. Each geometric pattern has vertices such as corners 904 represented here as small squares. The geometric patterns are grouped into a first cluster 906 and a second cluster 908. The first cluster 906 has a cluster center 910 and the second cluster has a cluster center 912. Each set of corners 904 for a given geometric pattern have coordinates around the location of a detected shelf edge label. The number of clusters provides an estimate of the number of shelf edges in the image. Since the shelf edges run horizontally across the image field 902, the clustering operation to define the first and second clusters 906, 908 can be performed using kernel density estimation using a large kernel bandwidth in the horizontal direction of the image field 902 relative to a kernel bandwidth in a vertical direction of the image field 902. For example, the kernel bandwidth in the horizontal direction can be set to equal the image field width and the kernel bandwidth in the vertical direction could be set to approximate the shelf edge width. Corners 904 can be associated with a particular cluster 906, 908 based on minimizing a distance measure between vertical co-ordinates of the corners 904 and centers 910, 912 of the clusters. For each cluster 906, 908 the particular corners associated with each respective cluster 906, 908 can be used to determine the shelf edge regions 914, 916.

Figure 10:
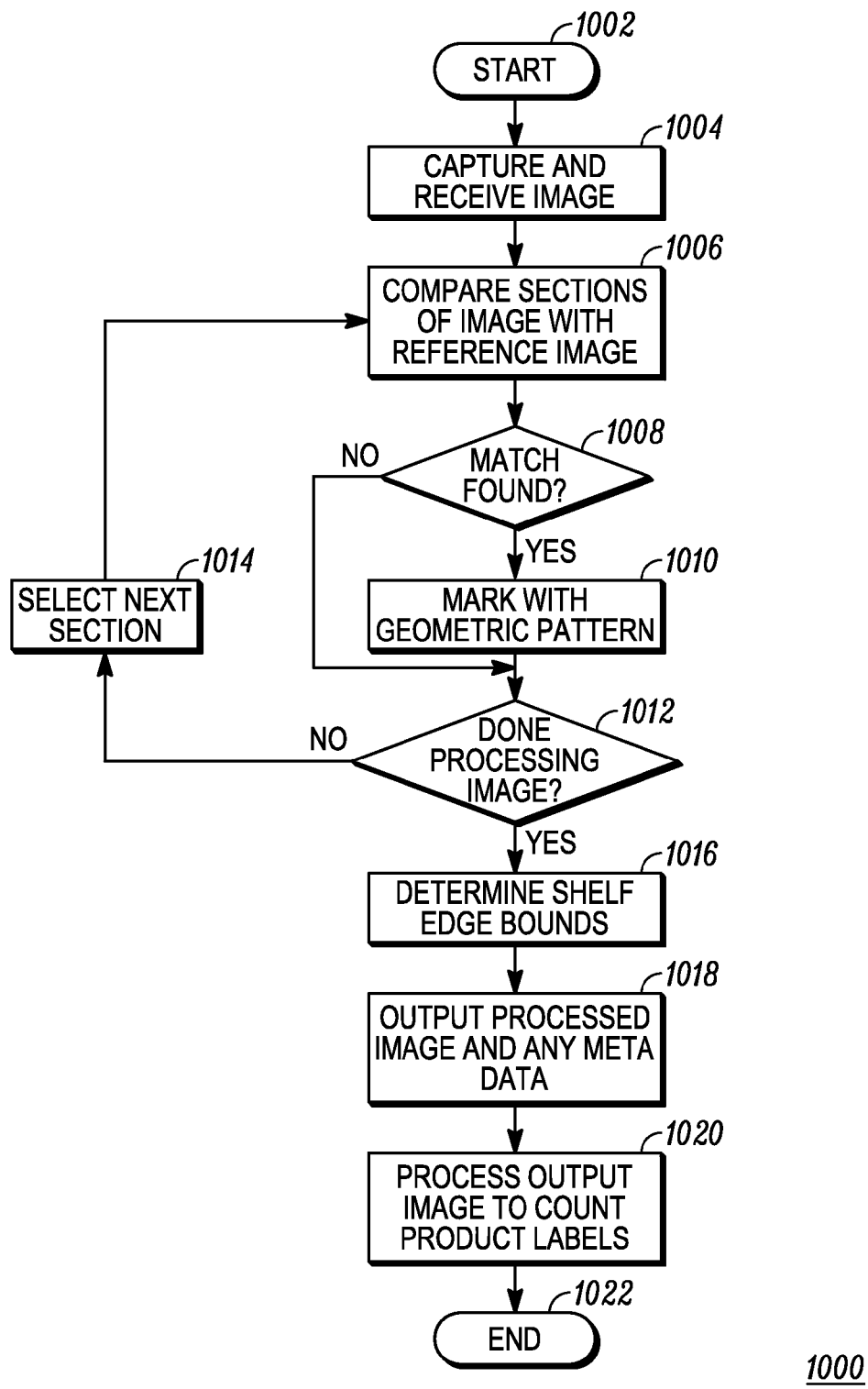
FIG. 10 is a flow chart diagram of a method for image processing to avoid counting shelf edge promotional labels when counting product labels in accordance with some embodiments.

FIG. 10 is a flow chart diagram 1000 of a method for image processing a store shelf image to avoid counting shelf edge promotional labels when counting product labels, in accordance with some embodiments. At the start 1002 the method commences with a system in place that provides the functionality of a system such as that shown, for example, in FIG. 3. The method 1000 proceeds to step 1004 where the system captures a store shelf image that is then received by, for example, a shelf edge detection component of the system. The shelf image can include various types of content, including product items and shelf edge labels. To commence processing the received image, the method 1000 can compare sections of the image with one or more reference images or data representing reference images in step 1006. The reference images can be represented or modeled, and stored in a database associated with the system. The reference images represent images of shelf edge labels or promotional items that can be placed on a shelf edge. The process looks for matches, which can be performed using a statistical matching process, in step 1008. If a match is found, the matching section of the image can be demarcated in process 1010, such as by a geometric pattern of elements or corners that have coordinates corresponding to locations in the image around the matching content. In some embodiments the geometric pattern can be a quadrilateral that is estimated based on the matching content. Subsequent to step 1010, or if, in step 1008 no match is found, the method 1000 proceeds to determine if the image has been fully evaluated in process 1012. If not, the method 1000, in step 1014, selects the next region and repeats step 1006-1012.

Once the image has been fully processed to detect matches between portions of the image and the reference images, the method 1000 can proceed to step 1016 to determine shelf edge bounds by grouping common vertices or corners of the geometric patterns, and fitting lines through commonly ordered corners, or sets of corners, thereby defining upper and lower bounds of each store shelf edge in the image. In step 1018 the shelf edge detection component can provide an output that allows a product recognition and counting component to avoid counting shelf edge labels as product items. The output can be in the form of an image where the regions between the determined upper and lower shelf edge bounds have been obscured, or it can be metadata identifying those regions in the image so that the product recognition and counting component can avoid processing those regions in attempting to recognize product item labels. Using the output of the shelf edge detection component, a product recognition and counting component can process the output and recognize and count product instances in the image by, for example, counting instances of product labels in the image in step 1020. Upon processing the image to count instances of product items in the image the method can end 1022 by providing a count in a report.

In general, embodiments include a method and apparatus for identifying edge regions in an image. The method can include receiving an image containing at least one edge region, such as, for example, a shelf edge. The edge region contains patterned content, such as, for example a shelf edge labels, cards, and other patterned content having pictographic media visible thereon. The method can further include identifying individual occurrences of the patterned content in the image by comparing sections of the image to a reference image of the patterned content. The method can further include demarcating each identified individual occurrence of the patterned content in the image with commonly oriented geometric pattern having at least one point above and at least one point below each individual occurrence of the patterned content. The points can be corners or vertices of a geometric pattern, and can be located at coordinates corresponding to positions around an identified patterned content occurrence to demarcate the identified patterned content occurrence. The method can include clustering of the elements to estimate the number of shelf edges present in an image. For each cluster the method can include grouping the points above each individual occurrence of the patterned content belonging to that cluster to define an upper bound of the edge region and grouping the points below each individual occurrence of the patterned content belonging to that cluster to define a lower bound of the edge region.

Accordingly, embodiments of the disclosure provide the benefit of reducing or eliminating the false counting of shelf edge labels as product labels in a store shelf image processing system for determining the number of product items on a shelf at a given time. By eliminating false counting of shelf edge labels, more accurate shelf information can be developed to allow better decision making with respect to factors such as product location, replenishment of product on shelves, the effectiveness of pricing, among other factors that may be of interest to store operators.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for identifying edge regions in an image, comprising:
   receiving an image containing at least one edge region, the edge region containing patterned content;
   identifying, using a processor, individual occurrences of the patterned content by comparing sections of the image to a reference image of the patterned content;
   demarcating, using the processor, each identified individual occurrence of the patterned content in the image with a commonly oriented geometric pattern having at least one corner associated with a first side of the corresponding pattern content and at least one corner associated with a second side of the corresponding patterned content; and
   splitting, using the processor, the corners into first and second sets, with the first set indicative of a first boundary of an edge and the second set indicative of a second boundary of the edge; and
   generating, using the processor, an indication of the first and second boundaries to enable exclusion of the edge from a recognition process.

2. The method of claim 1, wherein demarcating each individual occurrence of the patterned content with the commonly oriented geometric pattern comprises demarcating each individual occurrence of the patterned content with an estimated quadrilateral.

3. The method of claim 1, wherein comparing sections of the image to the reference image of the patterned content comprises:
   determining interest point matches between the image and the reference image; and
   applying a geometric model fitting and verification algorithm to estimate a quadrilateral based on the interest point matches.

4. The method of claim 1, further comprising fitting a first line to define the first boundary and a second line to define the second boundary, and wherein a space between the first line and the second line is identified as the edge.

5. The method of claim 1, further comprising clustering corners of different occurrences of the patterned content by selecting a kernel bandwidth in a horizontal direction of the image that is larger than a kernel bandwidth in a vertical direction of the image.

6. The method of claim 5, wherein clustering the corners further comprises associating corners to a cluster based on minimizing a distance measure between vertical co-ordinates of the corners and a center of the cluster.

7. The method of claim 1, wherein generating the indication of the first and second boundaries comprises generating a processed image having the edge obscured.

8. The method of claim 1, wherein generating the indication of the first and second boundaries comprises generating metadata that identifies the edge in the image, wherein the recognition process is to use the metadata to avoid analyzing the edge.

9. A product shelf image processing system, comprising:
   a camera that captures an image containing at least one product shelf having an edge upon which shelf edge content is present; and
   a processor to:
   receive the image from the camera;
   identify individual occurrences of the shelf edge content by comparing sections of the image to at least one reference image of the shelf edge content;
   demarcate each identified individual occurrence of the shelf edge content in the image with a commonly oriented geometric pattern having at least a first corner and a second corner opposing the first corner; and
   split the corners into first and second sets, with the first set indicative a first boundary of the shelf edge and the second set indicative of a second boundary of the shelf edge; and
   generate an indication of the first and second boundaries to enable exclusion of the edge from a recognition process.

10. The product shelf image processing system of claim 9, wherein the processor is to not count shelf edge content as product labels while it recognizes and to count product labels in the image.

11. The product shelf image processing system of claim 9, where the processor is to determine interest point matches between the image and the reference image, and apply a geometric model fitting and verification algorithm to estimate a quadrilateral based on the interest point matches.

12. The product shelf image processing system of claim 9, wherein generating the indication of the first and second boundaries comprises generating a processed image having the edge obscured.

13. The product shelf image processing system of claim 9, wherein generating the indication of the first and second boundaries comprises generating metadata that identifies the edge in the image, wherein the recognition processing is to use the metadata to avoid analyzing the edge.

\* \* \* \* \*